Figure 1:
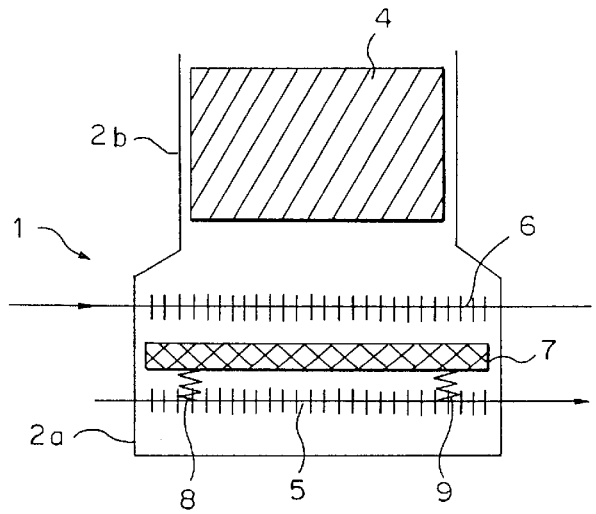

United States Patent [19]
Obermoser

[11] Patent Number: 6,041,599
[45] Date of Patent: Mar. 28, 2000

[54] THERMAL POWER MACHINE HAVING A MOVING REGENERATOR

[76] Inventor: Karl Obermoser, Vogtstrasse 15, 86653 Monheim, Germany

[21] Appl. No.: 09/155,853
[22] PCT Filed: Apr. 10, 1997
[86] PCT No.: PCT/EP97/01801
    § 371 Date: Oct. 5, 1998
    § 102(e) Date: Oct. 5, 1998
[87] PCT Pub. No.: WO97/38220
    PCT Pub. Date: Oct. 16, 1997

[30] Foreign Application Priority Data

Apr. 11, 1996 [DE] Germany .......................... 196 14 359

[51] Int. Cl.[7] .................................................. F01B 29/10
[52] U.S. Cl. ................................. 60/526; 60/513; 60/515
[58] Field of Search .............................. 60/523, 524, 526, 60/513, 515

[56] References Cited

U.S. PATENT DOCUMENTS 3,484,616  12/1969  Baumgardner et al. .
3,513,659   5/1970  Martini .
3,604,821   9/1971  Martini .
3,788,772   1/1974  Noble .
4,367,625   1/1983  Vitale ..................................... 60/526 X
5,417,066   5/1995  Kawano et al. ....................... 60/526 X

FOREIGN PATENT DOCUMENTS 4109289  10/1991  Germany .
19614359  8/1997  Germany .
7514182   6/1977  Netherlands .

Primary Examiner—Hoang Nguyen
Attorney, Agent, or Firm—Browdy and Neimark

[57] ABSTRACT

The invention relates to a thermal machine having a housing (2, 2a, 2a', 2b) which defines an operating space, an operating space, an operating medium which is contained in the operating space, a heat source (6, 6') which is arranged in the housing (2, 2a, 2a', 2b) as well as a heat sink (5, 5') which is arranged in the housing (2, 2a, 2a' 2b), a regenerator (7, 7') which forms an intermediate heat store which is mounted such that it can move linearly in the operating space, and at least one operating piston (4, 13, 14, 20, 20', 25) which is acted on by the operating medium, for outputting mechanical power from the operating space, and for coupling mechanical power from the operating space. The invention provides that the operating piston (4, 13, 14, 20, 20' 25) is arranged in or on the housing (2, 2a, 2a', 2b) such that its compression movement is associated with a volume flow of the operating medium from the heat source to the heat sink, and its expansion movement is associated with a volume flow in the reverse direction, and the force resulting from the volume flow is used to drive the regenerator (7, 7').

20 Claims, 2 Drawing Sheets

THERMAL POWER MACHINE HAVING A MOVING REGENERATOR

The invention relates to a thermal power machine of the type which is mentioned in the preamble of claim 1 and 9, is disclosed in DE-A1-41 09 289 and has a moving regenerator. The invention relates in particular to a thermal power machine for obtaining mechanical energy from solar energy.

One specific form of a thermal power machine having a regenerator is represented, for example, by the Stirling engine, also called a hot-gas engine, which embodies the oldest thermal power machine as well as the steam machine. The thermodynamic process of the Stirling engine comprises, in an idealized manner, four state changes: compression at low temperature (isothermal with heat extraction); heat supply at constant volume (isochoric); expansion at high temperature (isothermal with heat supply) and heat extraction at constant volume (isochoric). As a rule, Stirling engines have a stationary regenerator. Exceptions to this are low-temperature Stirling engines and cryocoolers.

In the case of Stirling engines of the type explained above, an auxiliary device is normally provided by means of which the regenerator is moved backward and forward between the heat sink and the heat source. This auxiliary device may be a mechanical coupling between the operating piston and the regenerator, with the interposition of an inertia mass. The disadvantage of this arrangement is its relatively complicated structure.

As an alternative to this, it is known for the regenerator of a Stirling engine to be moved backward and forward by a separate variable-volume component in the form of a small auxiliary piston which draws its power from the pressure fluctuations of the operating medium in the housing of the Stirling engine. As in the case of the solution using mechanical feedback from the operating piston to the regenerator, quoted above, the concept also has the disadvantage that an additional device, namely the auxiliary piston, is required. In addition, the force produced by the auxiliary piston is transmitted to the regenerator via a relatively small area. The forces to be overcome by the regenerator, namely its inertia and its flow resistance are, however, distributed homogeneously over the entire regenerator volume. For this reason, the physical difference between the force available from the auxiliary piston and the force required by the generator must be covered by said regenerator itself. However, because of its highly porous structure, the regenerator is not suitable for relatively large mechanical loads. For this reason, the use of an auxiliary piston is suitable for only very low Stirling engine frequencies at which no significant inertia forces occur, and thus only for low power densities. If, on the other hand, the power density is predetermined, as is the case, for example, with solar-powered flat collector engines, this concept is linked to large movement amplitudes of the regenerator and of the operating piston, as well, because of the low frequency. In addition, since a relatively high piston mass is required, the production costs of this thermal power machine type are correspondingly high. Furthermore, JP-3-78554A discloses a thermal power machine which has a large displacement cylinder and, coaxially with respect to it, a small piston cylinder, which cylinders are connected by a helical spring.

The invention is based on the object of providing a thermal power machine of the type mentioned initially and having a moving regenerator, with which higher operating frequencies and power densities can be achieved than with the conventional Stirling engine.

This object is achieved by the subject matter of claims 1 and 9. Advantageous developments of the invention are specified in the subclaims.

In the context of the present invention, operating piston should be understood as meaning any device which is suitable for varying the operating volume, for example a membrane, a bellows which is closed at one end, a liquid column or a gas column.

In other words, the thermal power machine designed according to the invention operates without an auxiliary device, which constrains a higher frequency, for controlling the regenerator in such a manner that the braking forces which occur in a homogeneously distributed manner throughout the entire regenerator during regenerator movement (i.e., inertia forces) are overcome by the operating forces which are distributed homogeneously throughout the entire regenerator (i.e., pressure forces), such that the regenerator is completely freed of mechanical loads during its linear or oscillating movement between the heat sink and the heat source. Because of the load-free (i.e., freely movable, or, not mechanically driven) linear movement of the regenerator, it can operate even at high frequencies up to, for example, 50 Hz or more.

In other words, because of its drive according to the invention, the regenerator is carried, via the volume flow of the operating medium, with this flow without any load. The movement of the regenerator in this case takes place phase-shifted with respect to that of the operating piston, because of its own inertia. The phase shift is adjustable by means of the mass and flow resistance of the regenerator and varies between >0 and <90 degrees.

In contrast to the Stirling engine mentioned initially, the thermodynamic process in the thermal power machine according to the invention takes place between two isotherms and two polytropic lines.

Options for extracting or supplying useful energy to or from the oscillating system according to the invention are known per se and therefore do not require any separate explanation in the present context.

A preferred embodiment of the thermal power machine according to the invention provides a structurally simple design of its essential elements, namely the regenerator, the heat sink and the heat source, as flat elements which run parallel to one another. In this configuration, the thermal power machine according to the invention is particularly suitable for a solar drive.

The operating piston of the thermal power machine according to the invention can be arranged in a different manner and in a different position with respect to the heat source, the heat sink and the regenerator, in order to produce a volume flow drive for the regenerator. A compact physical form of the thermal power machine results if the piston is arranged opposite the heat source on the housing of the thermal power machine, for example in the form of a conventional piston which is guided on the housing wall above the heat source.

According to an advantageous development of the invention, two operating pistons are provided in order to produce the volume flow required by the regenerator, which operating pistons are both driven starting from the heat source side of the source-regenerator-sink arrangement. In this case, the two operating pistons are preferably mounted such that they can move linearly, transversely with respect the movement direction of the regenerator, in a chamber which is formed integrally with the housing of the source-regenerator-sink arrangement. Furthermore, both operating pistons preferably have the same shape, the same mass and the same dimensions.

In addition, the invention proposes a refrigerating machine in the form of a twin thermal power machine, in which the machine units comprise two thermal power machine units of the type explained above, whose heat sources point outward and whose heat sinks are adjacent to one another, the two regenerators being driven by separate volume flows. In detail, the volume flow which is produced by one operating piston is in the opposite direction at any given time to the volume flow produced by the other operating piston, and the volume flow in the mirror-image plane of the machine is equal to zero at any given time.

In principle, the applications of the thermal power machine according to the invention are widespread. One particularly preferred application relates to the use of the thermal power machine in solar systems.

Figure 2:
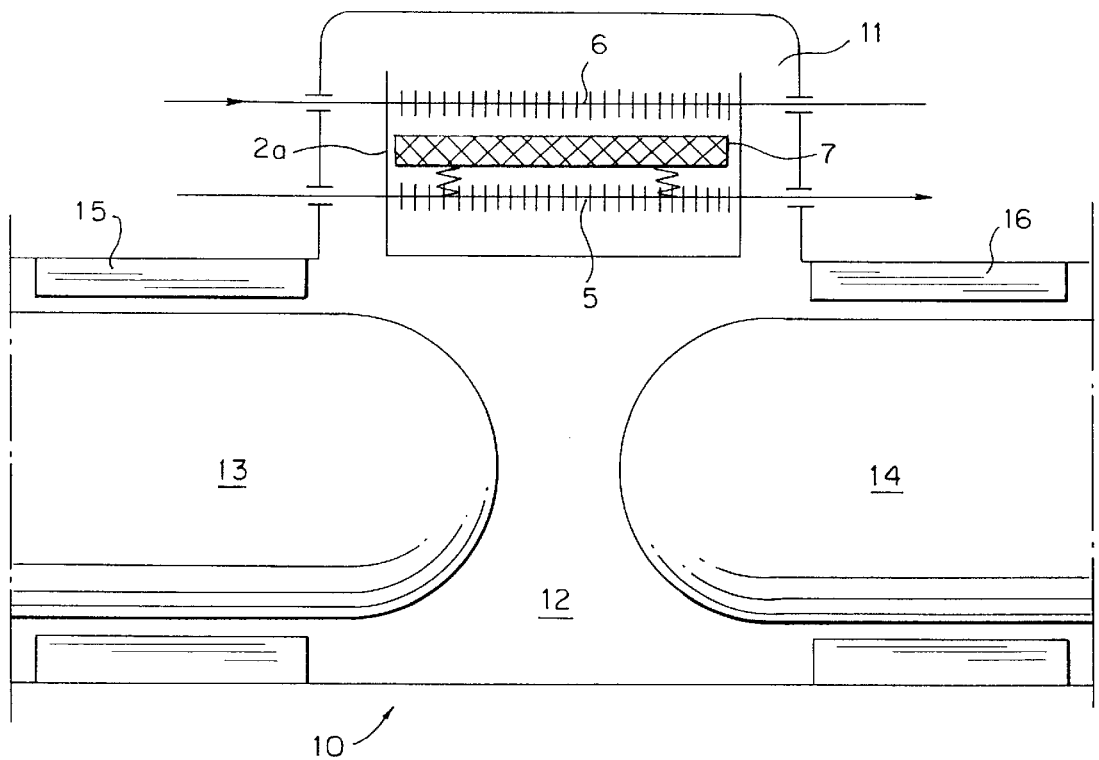
Figure 3:
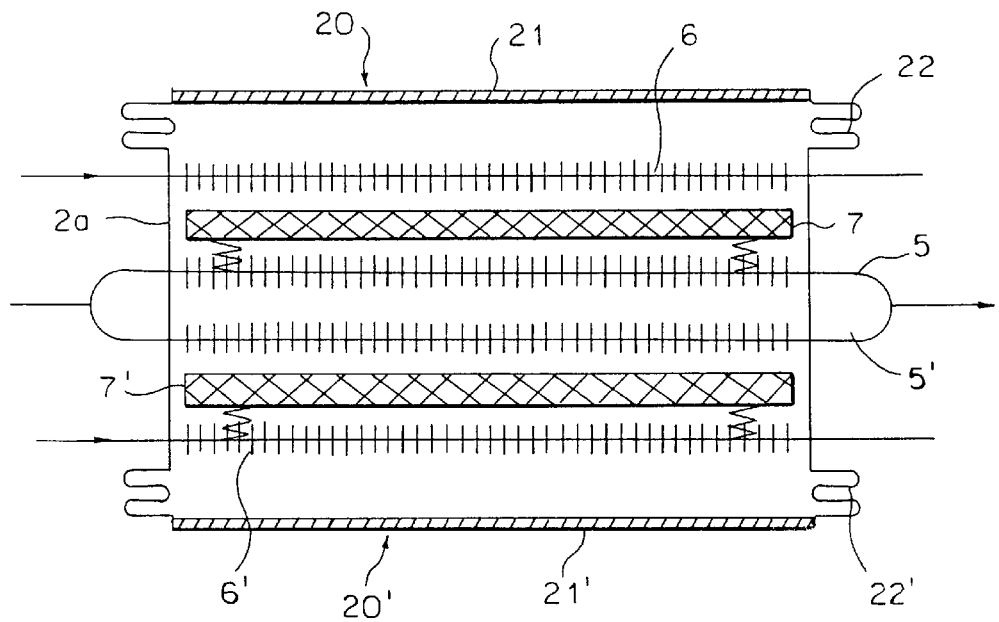
Figure 4:
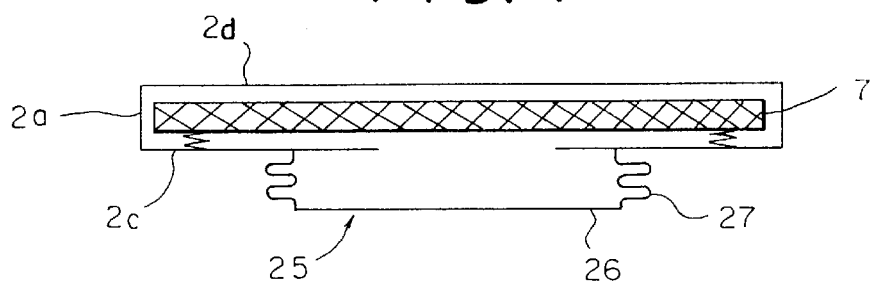
Figure 5:
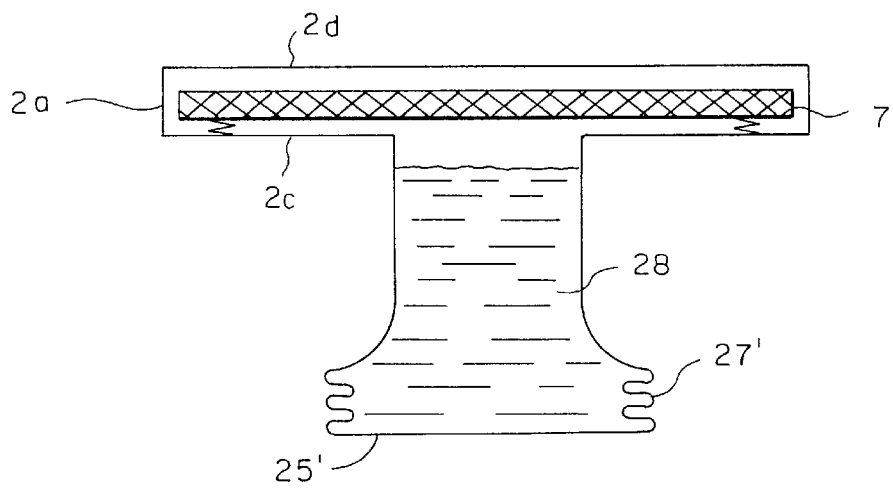

The invention will be explained in more detail in the following text using the drawing by way of example, in which:

FIG. 1 shows a first embodiment of the thermal power machine according to the invention using a single operating piston, FIG. 2 shows a second embodiment of the thermal power machine according to the invention using two operating pistons, FIG. 3 shows a third embodiment of the thermal power machine according to the invention as a twin refrigerating machine, FIG. 4 shows a fourth embodiment so the thermal power machine according to the invention using a single operating piston, and FIG. 5 shows a modification of the embodiment in FIG. 4.

As is shown schematically in FIG. 1, the first embodiment of the thermal power machine according to the invention comprises a generally cylindrical housing 1 having a housing part 2a of larger diameter and a housing part 2b of smaller diameter. An operating piston 4 is guided such that it can move linearly or backward and forward in the direction of the housing longitudinal axis in the housing part 2b of smaller diameter. The housing part 2a of larger diameter contains a heat sink 5, a heat source 6 which is opposite the heat sink 5 and is arranged underneath the piston 4, and a regenerator 7 which is arranged such that it can move in the direction of the housing longitudinal axis in the operating space between the heat sink 5 and the heat source 6, each of which is of a flat design. The structure of the heat sink 5, of the heat source 6 and of the regenerator 7 is prior art and, in particular, is familiar to the person skilled in the art in the field of Stirling engines. In principle, different materials may be considered for these components of the thermal power machine. The essential feature is that the regenerator 7 is composed of a porous, fluid-permeable material which is suitable for use as an intermediate heat store. The operating piston 4 may also be composed of basically any material which is suitable, for example, for use in a Stirling engine.

The housing 1 and the operating space of the thermal power machine are filled with an operating medium, for example with helium or, more cost-effectively, with air.

The regenerator 7 is suspended, via a regenerator mounting likewise in a manner known per se, in the housing 1 in such a manner that it can carry out its oscillating movement between the heat sink 5 and the heat source 6, without any significant tilting movements. Springs 8 and 9 are provided on the underneath of the regenerator 7, purely schematically for this purpose, in FIG. 1. In addition or alternatively, beads which are connected to the regenerator and the edge and are supported on the housing may also be considered for guiding the regenerator. Thus, the unlabeled zig-zag lines in the other figures schematically represent beads guiding the regenerator to move without significant tilting. Beads are shown schematically in FIG. 4.

One essential feature of the invention is that the operating piston 4 is arranged such that the volume flow which is produced by its linear movement drives the regenerator 7 without any mechanical loads. This achieves the result that the thermal power machine can operate at any operating frequency over a wide range.

A second embodiment of the thermal power machine according to the invention is shown in FIG. 2. This is a thermal power machine having two operating systems. In detail, the thermal power machine in FIG. 2 comprises the housing part 2a, of larger diameter, of the thermal power machine in FIG. 1, in which the heat sink 5, the heat source 6 and the regenerator are arranged in the same manner as in FIG. 1. The housing part 2a is arranged in the upper part 11 of a piston chamber 10, whose lower part 12, of larger volume, accommodates two identically designed coaxial operating pistons 13 and 14, which are guided such that they can slide. A guide ring 15 or 16, respectively, is provided in order to guide the pistons 13 and 14 such that they can slide transversely with respect to the regenerator movement direction. The interior of the housing 10 is filled with the operating medium which also fills the space in the housing part 2. The method of operation of the thermal power machine in FIG. 2 is in principle similar to that in FIG. 1.

FIG. 3 shows a twin thermal power machine which is formed from two thermal power machine units shown in FIG. 1 and which operates as a heat-powered refrigerating machine. In detail, the twin thermal power machine comprises a mirror-image arrangement of the two housing parts 2a from the embodiment in FIG. 1, as well as the Stirling engine components arranged in them. Using the same reference numbers as in FIG. 1, the twin thermal power machine accordingly comprises a housing part 2a in which a heat sink 5, a heat source 6 and a regenerator 7, arranged between them, are provided. On the heat source side, the housing 2a is closed by a piston 20, which comprises a piston wall 21 which is connected to the housing part 2a via a bellows 22 such that it is sealed. However, in principle, the classic design of the piston 4 in FIG. 1 is also feasible.

The advantage of the thermal power machine in FIG. 2 and FIG. 3 over that in FIG. 1 and FIG. 4 is that the machine center of gravity remains stationary when the machine is being operated, since the machine is counter-balanced to a certain extent.

As already stated, the twin thermal power machine in FIG. 3 comprises a mirror-image arrangement of the housing part 2a just explained with the machine components arranged in it and with the piston arranged on the outside, and the same components in the mirror-image part are designated by the same reference numbers, with a "'" added to them. In the illustrated exemplary embodiment, the two heat sinks 5 and 5' are connected to one another. As an alternative to this, the heat sinks 5 and 5' can also be formed integrally.

The housing parts 2a and 2a', which are closed by the pistons 20 and 20', are filled with a common operating medium and thus act on the same operating volumes. This duplicated Stirling engine operates in a push-pull mode, that is to say the pistons 20 and 20' as well as the regenerators 7 and 7' carry out linear movements synchronously and act on the same operating medium and, respectively, are driven without any load by the same operating medium, as explained above.

FIG. 4 shows the fourth embodiment of the thermal power machine according to the invention. This embodiment differs from the first embodiment shown in FIG. 1 in principle in that the entire housing forms the piston.

In detail, the operating piston is not guided such that it can slide in a separate housing part 2b, but the entire housing forms the piston, with the exception of the bottom plate 26, which is connected to the housing part 2a via a bellows 27 such that it is sealed, and on which this embodiment of the thermal power machine according to the invention is supported.

Furthermore, the housing bottom wall 2c to which the bellows 25 with the bottom plate 26 is connected and which has a central communication opening for the operating medium to pass through is formed as a heat sink, and the opposite housing top wall 2d is formed as a heat source. This thermal power machine is particularly highly suitable for use as a solar thermal power machine because of its exposed heat source.

A modified embodiment or the thermal power machine in FIG. 4 is shown in FIG. 5. In this embodiment, the housing lower part accommodates a water column 28 which, on the one hand, carries the housing weight because of the difference between the bellows cross-section and the column cross-section and, on the other hand, for the same reason oscillates in antiphase to the housing, so that the piston mass is formed by the sum of the water mass and the housing.

I claim:

1. A thermal machine for working with an operating medium, the machine comprising:
   a housing (2, 2a 2b) which defines an operating space wherein the operating medium is contained;
   a heat source (6, 6') which is arranged about the housing (2, 2a, 2b);
   a heat sink (5, 5') which is arranged about the housing (2, 2a);
   a regenerator (7, 7') comprising an intermediate heat store;
   a regenerator mounting adapted for a traveling motion in the operating space between the heat source (6, 6') and the heat sink (5, 5');
   at least one operating piston (4, 13 14, 20, 20');
   wherein the heat source (6, 6') is arranged in a region of one end of the traveling motion of the regenerator (7, 7') and the beat sink (5, 5') is arranged in a region of another end of the traveling motion of the regenerator (7, 7');
   wherein the heat source is arranged in the housing (2b) between the operating piston (4, 20, 20') and the regenerator (7, 7');
   wherein the operating piston (4, 13, 14, 20, 20') is arranged about the housing (2, 2a, 2b) such that a compression movement thereof causes a first volume flow of the operating medium from the heat source (6, 6') to the heat sink (5, 5'), and an expansion movement thereof causes a second volume flow in a reverse direction; and
   wherein the first volume flow and the second volume flow move the regenerator (7, 7') as a result of flow resistance of said regenerator.

2. The thermal machine according to claim 1, wherein the regenerator (7, 7') is mounted to be movable load-free between the heat source (6, 6') and the heat sink (5, 5'), whereby the regenerator free of mechanical loads and is driven only by the working fluid and all forces on the regenerator are homogeneous.

3. The thermal machine according to claim 1, wherein the regenerator is mounted for to be movable without tilting movements.

4. The thermal machine according to claim 1, wherein the heat sink is on or in the housing.

5. The thermal machine according to claim 1, wherein the regenerator (7, 7'), the heat source (6, 6'), and the heat sink (5, 5') are formed as flat elements disposed generally parallel to one another.

6. The thermal machine according to claim 5, comprising a piston chamber wherein the operating piston (13 or 14) is mounted.

7. The thermal machine according to claim 1, comprising a piston chamber wherein the operating piston (13 or 14) is mounted.

8. The thermal machine according to claim 7, comprising two piston chambers (10) and two respective operating pistons (13, 14), wherein both operating pistons produce the first volume flow and the second volume flow volume flow.

9. The thermal machine according to claim 1, comprising:
   two operating pistons; and
   an arrangement of components, having a mirror-image symmetry, in a common housing (2a, 2a');
   the arrangement including:
      the heat sink or a pair of heat sinks (5, 5') being arranged at the center of the housing;
      a respective regenerator (7, 7') arranged on each of two sides of the heat sink or heat sinks (5, 5');
      a respective heat source (8, 6') arranged outside of the respective generator on each of the two sides
      a respective one of the two operating pistons (20, 20') being externally located and arranged outside of the respective heat source;
      wherein both of the operating pistons (20, 20') produce the first volume flow and the second volume flow.

10. The thermal machine according to claim 9, wherein the two operating pistons have similar shapes, dimensions, and masses.

11. The thermal machine according to claim 9, wherein the regenerator (7, 7'), the heat source (6, 6'), and the heat sink (5, 5') are formed as flat elements disposed generally parallel to one another.

12. The thermal machine according to claim 11, wherein the two operating pistons have similar shapes, dimensions, and masses.

13. The thermal machine according to claim 1, wherein the heat source and the heat sink comprise a bottom and a top of the housing.

14. A thermal machine for working with an operating medium, the machine comprising:
   a housing (2, 25 26) which defines a variable operating space and wherein the operating medium is contained;
   a heat source (2d) which is arranged about the housing (2, 25, 26);
   a heat sink (26) which is arranged about the housing (2, 25, 26);
   a regenerator (7, 7') comprising an intermediate heat store;
   a regenerator mounting adapted for a traveling motion in the operating space between the heat source (2d) and the heat sink (2c);
   at least one operating piston:
      wherein the housing (2a 25), except for a bottom plate (26) of said housing, comprises the operating piston;
      wherein a compression movement of the operating piston causes a first volume flow of the operating medium from the heat scarce (2d) to the heat sink (2c), and an expansion movement of the operating piston causes a second volume flow in a reverse direction, and wherein the first volume flow and the second volume flow move the regenerator as a result of flow resistance of said regenerator (7, 7').

15. The thermal machine according to claim 14, wherein the heat source and the heat sink comprise a bottom and a top of the housing.

16. The thermal machine according to claim 15, wherein the regenerator, the heat source, and the heat sink are formed as flat elements disposed generally parallel to one another.

17. The thermal machine according to claim 14, wherein the regenerator is mounted to be movable load-free between the heat source and the heat sink, whereby the regenerator is free of mechanical loads and is driven only by the working fluid and all forces on the regenerator are homogeneous.

18. The thermal machine according to claim 14, wherein the regenerator is mounted for to be movable without tilting movements.

19. The thermal machine according to claim 14, wherein the regenerator is mounted via beads.

20. The thermal machine according to claim 1, wherein the regenerator is mounted via beads.

* * * * *